(12) United States Patent
Monaghan et al.

(10) Patent No.: US 8,589,868 B2
(45) Date of Patent: Nov. 19, 2013

(54) CREATING A TERMINAL APPLICATION

(75) Inventors: Andrew Monaghan, Dundee (GB);
Wolf Rossmann, Angus (GB)

(73) Assignee: NCR Corporation, Duluth, GA (US)

( * ) Notice: Subject to any disclaimer, the term of this patent is extended or adjusted under 35 U.S.C. 154(b) by 1674 days.

(21) Appl. No.: 11/315,888

(22) Filed: Dec. 22, 2005

(65) Prior Publication Data

US 2007/0150749 A1    Jun. 28, 2007

(51) Int. Cl.
| | |
|---|---|
| *G06F 9/44* | (2006.01) |
| *G06F 7/08* | (2006.01) |
| *G06Q 40/00* | (2012.01) |
| *G07D 11/00* | (2006.01) |
| *G07F 19/00* | (2006.01) |
| *G06K 5/00* | (2006.01) |

(52) U.S. Cl.
USPC ........... 717/109; 717/104; 717/105; 717/106; 235/379; 235/380; 235/381

(58) Field of Classification Search
None
See application file for complete search history.

(56) References Cited

U.S. PATENT DOCUMENTS

| | | | | |
|---|---|---|---|---|
| 6,219,628 | B1 * | 4/2001 | Kodosky et al. | 703/2 |
| 7,063,253 | B1 * | 6/2006 | Brausch et al. | 235/379 |
| 7,299,419 | B2 * | 11/2007 | Evans | 715/763 |
| 7,603,652 | B2 * | 10/2009 | Makowski et al. | 717/105 |
| 8,015,542 | B1 * | 9/2011 | Parthasarathy et al. | 717/105 |

OTHER PUBLICATIONS

Lysecky et al, "Dynamic FPGA Routing for Just-in-Time FPGA Compilation", 2004, DAC.*

* cited by examiner

*Primary Examiner* — Lewis A Bullock, Jr.
*Assistant Examiner* — Mark Gooray
(74) *Attorney, Agent, or Firm* — Paul W. Martin

(57) ABSTRACT

A configuration creator for use in creating a terminal application for a target apparatus. The configuration creator comprises: (i) an indexing routine for examining available software components that can be used in the terminal application and ascertaining possible type-safe relationships for each software component, (ii) a graphical user interface including a control area for displaying classes that can be used in the terminal application, and an association area for creating instances of the displayed classes and allowing type-safe relationships to be established between created instances, and (iii) a file creation routine for creating a configuration file including code describing created instances and relationships established between the created instances. The configuration file can subsequently be parsed to create a terminal application for use in a target apparatus, such as a self-service terminal.

9 Claims, 4 Drawing Sheets

CREATING A TERMINAL APPLICATION

The present invention relates to a method and system for creating a terminal application.

BACKGROUND

Terminal applications are widely used on self-service terminals (SSTs) to enable the SST to operate and to provide services to users of the SST. SSTs are public-access terminals that are used by members of the public to conduct transactions and/or to receive information in an unattended/unsupervised environment. SSTs are typically ruggedized, tamper resistant, and include software with advanced error handling capabilities to ensure that the SST is inherently resilient to internal failure or external attack. One common type of SST is an automated teller machine (ATM).

An ATM allows a user to conduct a financial transaction or to view financial information by providing a terminal application that controls the ATM. Like many complex software applications, ATM terminal applications are constructed from software components that are linked to form an operational application.

Terminal applications typically have four main types of components, namely: channel services, business services, channel application, and management services. Each of these four types contains multiple components.

The channel services components provide the ATM-specific software needed to operate devices (keypad, cash dispenser, and such like) within the ATM. The business services are components that provide a business function (such as a transaction authorization, a targeted advertisement, a balance enquiry, and such like). Business services and channel application components typically interact with channel services components through an industry standard interface (such as the CEN XFS interface), which enables them to issue industry-standard commands to any ATM, or other SST that is compliant with this industry-standard. This standard interface ensures that the business services components (that perform business functions) are independent of any specific model of ATM (or other SST). The channel application is the application layer that controls the services offered by the ATM. The channel application determines what business services will be offered to which user, and includes application flow logic and screens, as will be described in more detail below.

The application flow (sometimes referred to as the transaction flow) comprises: (i) the sequence of screens that are (or may be) presented to a user to gather information from the user to fulfil the user's request, and (ii) the logic that controls which screen is displayed, that branches to the next screen to be displayed in response to a user input or activity, that collates inputs received from the user, and that requests a business service to fulfil a selected transaction. The term application flow can refer to the actual sequence of screens seen by the user, or to a combination of the sequence of screens and the logic (software) that controls the screens and collates the user inputs.

The term "screen" is used herein to denote the graphics, text, controls (such as menu options), and such like, that are presented on an ATM display; the term "screen" as used herein does not refer to the hardware (that is, the display) that presents the graphics, text, controls, and such like. Thus, as used herein, "screen" refers to content, and "display" refers to hardware that presents the content.

When a transaction is being entered at an ATM, a series of screens is presented on the ATM display to lead a user through a transaction, the next screen displayed being dependent on a user entry or activity relating to the current screen. Each screen in the sequence represents a state within a given application flow. For example, a first screen may request a user to insert a card; once a card has been inserted the application flow logic advances to a second screen that may invite the user to enter his/her PIN; once the final digit of the PIN has been entered, the application flow logic advances to a third screen that may invite the user to select a transaction from a list of transactions (cash withdrawal, printed statement, balance enquiry, deposit, and such like); and so on until the transaction is fulfilled.

The fourth type of component (the management services components) handle management of the devices within the ATM (for example, a cash dispenser, receipt printer, journal printer, serial bus, and such like), consumables used by the ATM (for example, paper for a receipt printer, paper for a journal printer), and software executing on the ATM (channel services, channel application, and business services).

Depending on the business services to be provided to ATM users, and the physical configuration of an ATM (for example, the devices installed), different software components from the four main types of components will be required. To state this another way, the software components required will typically be a subset of components from each of the four main types of components. This means that there must be a customized software build for each ATM configuration. To enable the selected types of software components to operate together, these software components must be configured and related together as part of a custom ATM application for the particular business services offered and ATM devices installed.

In prior art applications, the relationships between these software components were typically created using one of two methods.

The first method is to program the software components together using source code (for example, $C^{++}$) and compile them into an application. This process of combining the software components is a programming task that requires skill and a process (compilation and deployment) that inhibits rapid change of the application. However, this process is "type-safe", which means that the validity of the application (validating the software components will work together) is checked. Type-safe code cannot perform an operation on an object that is invalid for that object.

The second method is to script the software components together using a scripting language (for example, Javascript), which is interpreted by the ATM at runtime. This process of combining the software parts is a faster programming task and does not involve compilation, but it is not "type-safe", so the validity of the application is not checked.

It is among the objects of an embodiment of the present invention to provide a terminal application that obviates or reduces the problems associated with prior art methods of creating relationships between software components.

SUMMARY

According to a first aspect of the present invention there is provided a method for creating a terminal application for use in a target apparatus, the method comprising: accessing software components that may be used in the terminal application; retrieving type information associated with each class within the software components to ascertain type-safe relationships that are possible for each class; graphically representing each class in a control area of a screen together with type-safe relationship information for that class; providing an association area of the screen to allow a user to create on the association area an instance of a class graphically represented on the control area; allowing a user to establish a relationship between an instance from one class and an instance from a different class only when the relationship is consistent with the type-safe relationship information for both classes; creating a configuration file describing the created instances and the relationships between the created instances, so that the configuration file can be parsed to create a terminal application for use in a target apparatus.

The software components that may be used in the terminal application may be binary software components, such as dynamic linked library (DLL) components. DLLs typically contain many different classes.

Retrieving type information may be performed by using a Reflection command, or other command that allows an application to discover information about itself or a software component (such as a DLL). Once retrieved, the type information can be analyzed to ascertain what type-safe relationships are possible. As used herein, type information for a class relates to a description of that class, including the interfaces, operations, properties, and events that are exposed by that class.

The control area can serve as a palette from which classes can be selected for use in the association area. An instance of a class can be created by dragging the graphical representation of that class from the control area (palette) to the association area (which serves as a canvas). When an instance of a class is created, a code sequence is added to the configuration file that describes the instance by referencing a unique class identifier for the class from which the instance was derived, the name of the class, and the software component that contains the class. The code sequence also includes type information, in the form of properties, operations, and events that are associated with that instance.

Any instance can be created on the association area, but one instance can only be associated with another instance if the type-safe relationship information for each class permits the relationship. For example, if the type information includes a property that is related to a particular business service, then a relationship can be established between that instance and an instance of the business service. When a relationship is established between two instances, the code sequence is updated to include this relationship. This is achieved by updating a value field in the property that is related to the particular business service.

The method may further include: receiving the configuration file at the target apparatus; accessing the software components that may be used in the terminal application; interpreting the configuration file to ascertain instances referenced by that file and relationships between instances referenced by that file; and creating a run-time executable code using the configuration file and the software components that may be used in the terminal application.

By virtue of this aspect of the invention, the flexibility of a scripting method is combined with the type-safe advantages of a compilation method, without requiring programming skill. This is achieved by creating an intermediate file (the configuration file), that describes the instances and the relationships needed in a run-time executable file, but that ensures that only type-safe relationships are allowed. This intermediate file can then be interpreted on a target apparatus to derive the run-time executable file.

According to a second aspect of the present invention there is provided a system for creating a terminal application for use in a target apparatus, the system comprising:

(A) a configuration creator operable to (i) retrieve type information associated with each class within software components to ascertain type-safe relationships that are possible for each class, (ii) allow a user to create an instance of a class, (iii) allow a user to establish a relationship between an instance from one class and an instance from a different class only when the relationship is consistent with the type-safe relationship information for both classes, and (v) create a configuration file describing the created instances and the relationships between the created instances; and (B) a configuration builder operable to parse the configuration file and thereby build a run-time executable terminal application for use in the target apparatus.

The configuration creator may allow a user to configure an instance by editing the properties associated with that instance. For example, each property may have a name and a corresponding value; by modifying that value, the behaviour of the instance will be changed. For example, a withdrawal transaction instance may have a property called currency having a default value of EUR (which refers to the Euro); however, a user can change this to USD, so that the default currency becomes the U.S. dollar.

The configuration builder parses the configuration file and locates the software components that are referenced by the configuration file. For each software component, the configuration builder creates an instance of the class referenced by the configuration file, sets all of the properties of that class according to the configuration file, and creates relationships to other instances associated with that instance.

To ensure that all instances are created in a valid order, the configuration builder ascertains which instances do not depend on other instances, and creates them first. Next, the configuration builder creates those instances that depend only on instances already created by the configuration builder. This continues until all of the instances have been created.

Once all of the instances have been created and configured, the configuration builder indicates that the terminal application has been created and is ready to run. A user (which may be either a human or a different software entity) can then execute the terminal application, which begins to offer services (as provided by the terminal application) on the target apparatus.

According to a third aspect of the present invention there is provided a configuration creator for use in creating a terminal application for a target apparatus, the configuration creator comprising: (i) an indexing routine for examining available software components that can be used in the terminal application and ascertaining possible type-safe relationships for each software component, (ii) a graphical user interface including a control area for displaying classes that can be used in the terminal application, and an association area for creating instances of the displayed classes and allowing type-safe relationships to be established between created instances, and (iii) a file creation routine for creating a configuration file including code describing created instances and relationships established between the created instances, so that the configuration file can be parsed to create a terminal application for use in a target apparatus.

The indexing routine may include using a command such as Reflection, which allows an application to discover information about itself so that it may display this information to the user. Reflection can discover metadata (data about data) so that it can discover the type information of each software component, such as what properties an object or class has.

Although the word "routine" is used above, this is not intended to be restricted to procedural programs. The configuration creator may be coded using object-oriented programming techniques, procedural programming techniques, or any other convenient programming methodology.

The graphical user interface preferably provides a control area in the form of a palette, and an association area in the form of a canvas. The control area may present available classes. A user can drag a class from the palette to the canvas and the configuration creator creates an instance of the class on the canvas, and, based on the indexing, restricts any associations to that instance to those associations that are type-safe for that instance. This ensures that only type-safe applications can be created by the user.

The graphical user interface may allow a user to configure an instance by editing the properties associated with that instance. For example, each property may have a name and a corresponding value; by modifying that value, the behaviour of the instance will be changed. For example, a withdrawal transaction instance may have a property called currency having a default value of EUR (which refers to the Euro); however, a user can change this to USD, so that the default currency becomes the U.S. dollar.

The target apparatus may be a self-service terminal, such as an ATM, an information kiosk, a self-checkout terminal, a check-in terminal (for an airline, a hotel, or such like), a postal centre, a financial services centre (offering a wide array of financial services such as money order printing, check cashing, and such like), or such like.

By virtue of this aspect of the invention a configuration file is provided that includes information relating to (i) the name of each instance, (ii) the relationships between instances, and (iii) configuration information for each instance, such as properties of that instance that may have been modified by the user.

According to a fourth aspect of the present invention there is provided a computer program comprising program instructions for: (i) examining available software components that can be used and ascertaining possible type-safe relationships for each software component, (ii) displaying classes that can be used, creating instances of the displayed classes, and allowing type-safe relationships to be established between created instances, and (iii) creating a configuration file including code describing created instances and relationships established between the created instances, so that the configuration file can be parsed to create a terminal application for use in a target apparatus.

The computer program may be embodied on a record medium, stored in a computer memory, carried by an electrical signal, or such like.

It will now be appreciated that the above aspects of the invention have the advantages that less-skilled developers can assemble and configure the terminal application from a set of components since no additional source code is needed to assemble and configure the terminal application. The configuration creator validates the combination of instances based on the class type meta information without the need for compilation, thereby guaranteeing that the assembled application will execute correctly. Developers of software components do not have to add any features to their components to enable their components to be used by the configuration creator and the configuration builder. The configuration creator and the configuration builder are compatible with conventional object-oriented software components because they can ascertain the type information from these software components, this has the advantage that the configuration creator and the configuration builder are backwardly compatible.

These and other aspects of the present invention will be apparent from the following specific description, given by way of example, with reference to the accompanying drawings.

DETAILED DESCRIPTION

Figure 1:
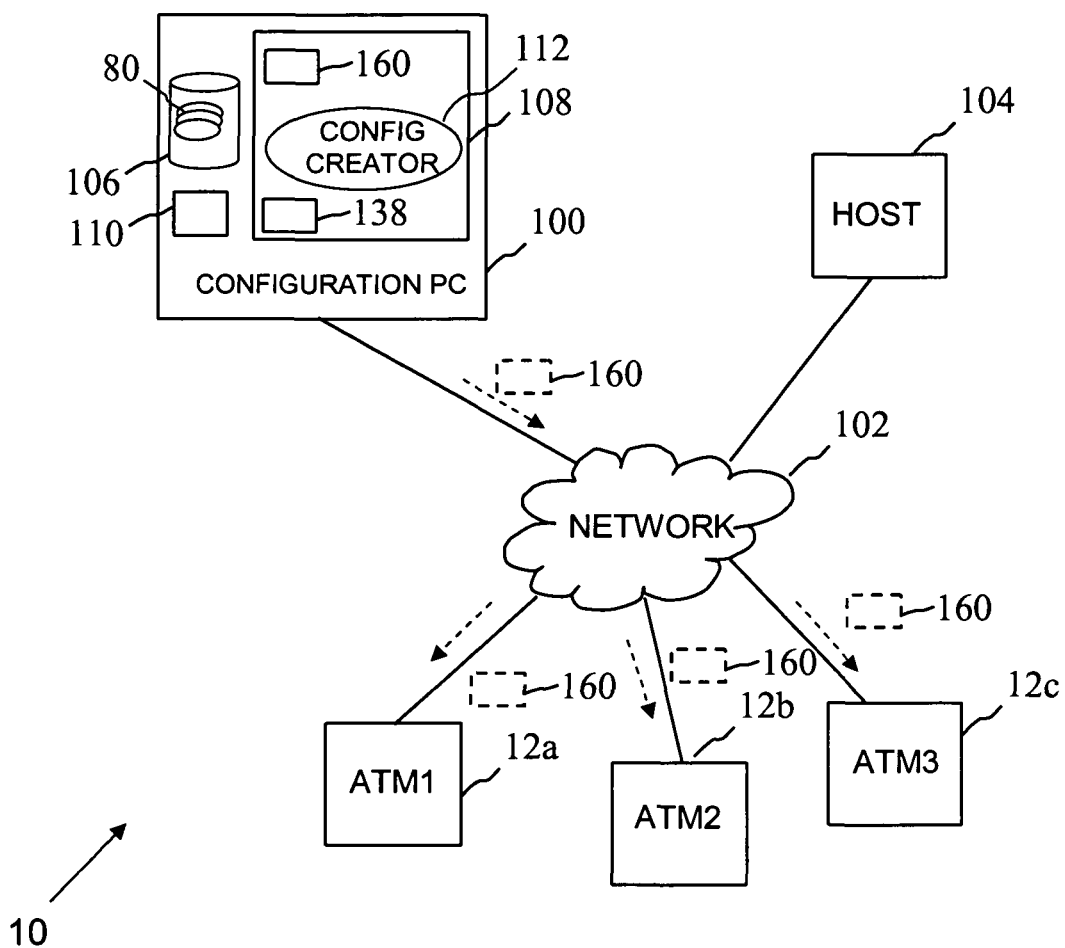
FIG. 1 is a block diagram of a system for creating a terminal application according to one embodiment of the present invention.

Reference is first made to FIG. 1, which is a block diagram of a system 10 for creating a terminal application for use in a target apparatus. In this embodiment, the target apparatus 12 is an automated teller machine (ATM) and the terminal application is an ATM application.

Figure 2:
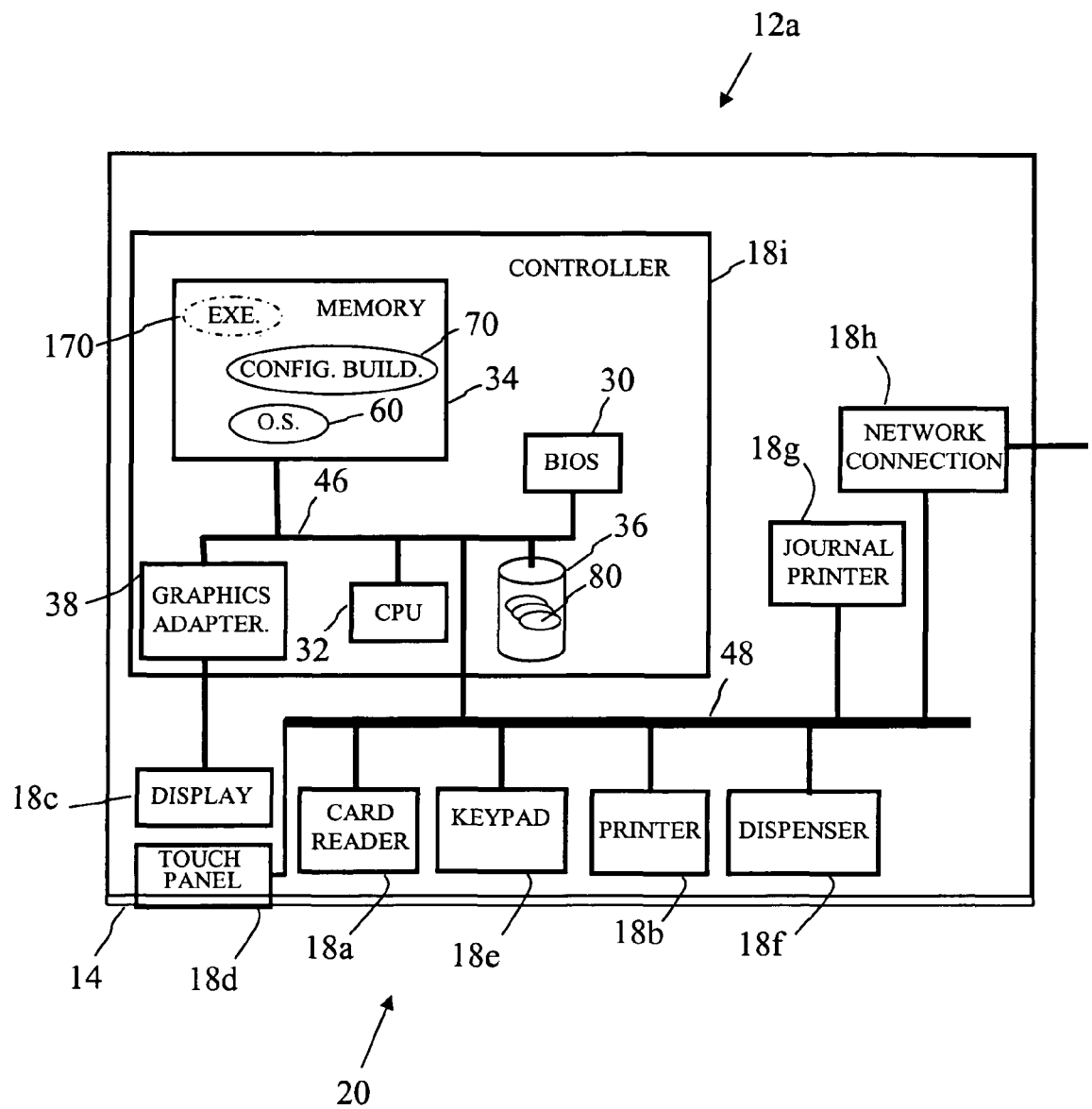
FIG. 2 is a block diagram illustrating one of the components (an ATM) of the system of FIG. 1 in more detail.

In FIG. 1, three different ATMs 12a,b,c are shown, but these ATMs have identical configurations (they each have the same devices installed) so they can each run the same terminal application. Reference is now also made to FIG. 2, which is a schematic diagram illustrating the ATM 12a of FIG. 1 and showing a fascia 14 through which internal devices 18 are accessed by a customer of the ATM 12. The fascia 14 and the customer-accessible devices 18 form part of a user interface 20 to allow a customer to interact with the ATM 12. In particular, the fascia 14 has apertures (not shown) aligning with some of the devices 18 when the fascia 14 is in a closed position.

The fascia 14 defines: a card reader slot aligning with a card reader device 18a; a receipt printer slot aligning with a receipt printer device 18b; a display aperture aligning with a display 18c and an associated touch sensitive panel 18d mounted on, and in registration with, the display 18c; a keypad aperture through which an encrypting keypad device 18e protrudes; and a dispenser slot aligning with a dispenser device 18f in the form of a cash dispenser.

The ATM 12 also includes the following internal devices 18 that are not directly viewed or accessed by a user during the course of a transaction. These devices 18 include: a journal printer device 18g for creating a record of every transaction executed by the ATM 12, a network connection device 18h for accessing a remote authorisation system (not shown), and a controller device 18i (in the form of a PC core) for controlling the operation of the ATM 12, including the operation of the other devices 18. These devices 18g,h,i are all mounted within the ATM 12.

The controller 18i comprises a BIOS 30 stored in non-volatile memory, a microprocessor 32, associated main memory 34, storage space 36 in the form of a magnetic disk drive, and a graphics adapter 38 in the form of a graphics card.

The BIOS 30, microprocessor 32, main memory 34, disk drive 36, and graphics card 38 are all replaceable modules within the controller device 18i.

The display 18c is connected to the microprocessor 32 via the graphics card 38 installed in the controller 18i and one or more internal controller buses 46. The other ATM devices (18a,b, and 18d to 18h) are connected to the ATM controller 18i via a serial bus 48 (in the form of a USB connection) and the one or more internal controller buses 46.

Each of the devices 18 is controlled by one or more channel services software components.

Initialisation of the ATM

When the ATM 12 is first booted up, the microprocessor 32 accesses the magnetic disk drive 36 and loads the main memory 34 with software components including: an operating system kernel 60 and a configuration builder 70. The configuration builder 70 is used to create a run-time executable terminal application (referred to hereinafter as an ATM application) that will control the operation of the ATM 12.

In this embodiment, the operating system is a Windows NT (trade mark) operating system, available from Microsoft Corporation. The operating system 60 includes a plurality of device drivers (not shown) for interfacing with standard computing devices such as the magnetic disk drive 36, the display 18c, a serial port, a parallel port, and such like. As is well known in the art, the operating system kernel 60 is responsible for memory, process, task, and disk management, and includes routines for implementing these functions.

The magnetic disk drive 36 also includes software components 80 that may be used in the ATM application. These software components 80 are a collection of DLLs. Each DLL is basically a container holding multiple classes.

Returning now to FIG. 1, the three ATMs 12 are connected to a development computer 100, via a network 102, and also to an authorization host 104 for authorizing financial transactions requested by a customer at one of the ATMs 12. The development computer 100 includes storage space 106 (in the form of a magnetic disk drive), memory 108, a processor 110, and such like features that are typically provided in a conventional personal computer.

The magnetic disk drive 106 stores a copy of the collection of DLLs 80 stored on the ATM 12, and a configuration creator 112 that is loaded into memory 108. When the configuration creator 112 is executed it provides the user with a graphical user interface (GUI) 118 as illustrated in FIG. 3a.

Figure 3A:
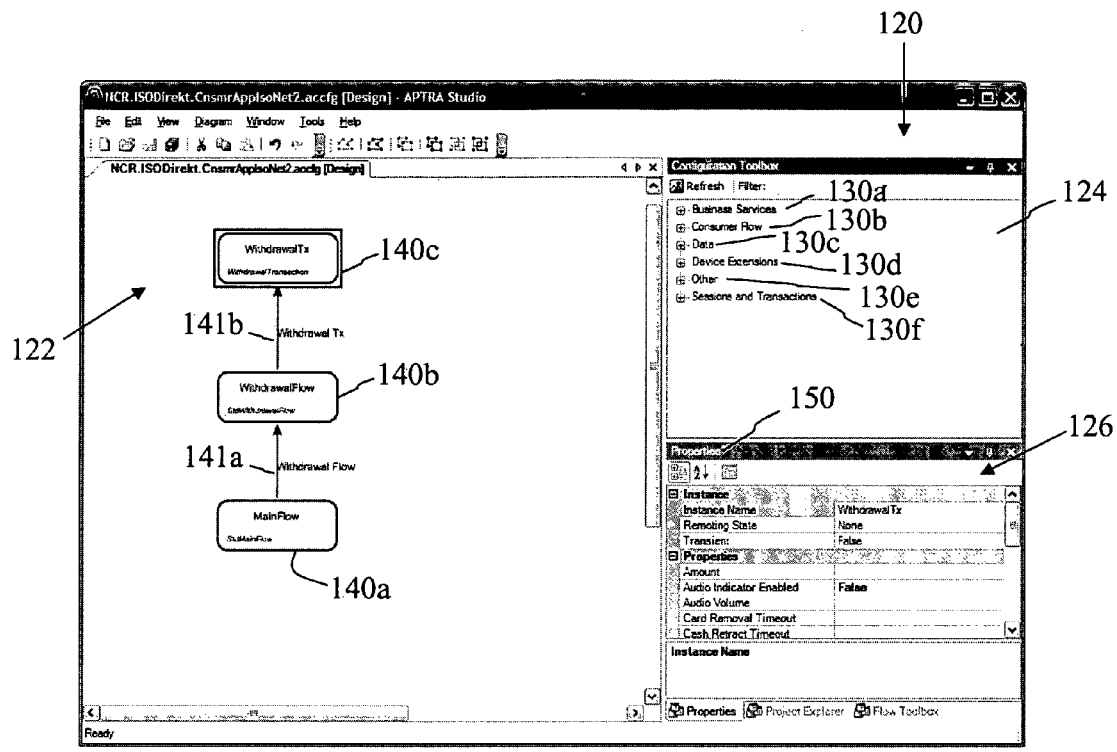
FIG. 3a is a pictorial diagram illustrating another component (a graphical user interface on a configuration computer) of the system of FIG. 1 in more detail, showing creation of the terminal application at an early stage.

As shown in FIG. 3a, the GUI 118 comprises a control area 120 and an association area 122. The control area 120 has an upper portion 124, referred to herein as the class listing area, and a lower portion 126, referred to herein as the properties listing area.

Initially, the configuration creator 112 performs an indexing function on the collection of DLLs 80. This involves the configuration creator 112 populating the class listing area 124 by accessing the collection of DLLs 80, ascertaining the classes stored therein, and loading these classes into the memory 108. The configuration creator 112 implements the indexing function using a Reflection command, which can access metadata (data about a class and its interfaces, operations, properties, and events) so that the configuration creator 112 can discover the type information for each class in the DLLs 80. The configuration creator 112 stores this type information in memory 108 for each class added to the class listing area 124. The control area 120 (more specifically the class listing area 124) serves as a palette from which instances of classes can be derived and placed on the association area 122.

For each class in memory 108, the configuration creator 112 extracts the name of the class and adds the name of the class to an appropriate class group 130 in the class listing area 124. As shown in FIG. 3a, there are a number of different class groups 130, including: "Business Services" 130a, "Consumer Flow" 130b, "Data" 130c, "Device extensions" 130d, "Other" 130e, "Sessions and transactions" 130f, and "Supervisor" (not shown in FIG. 3a). The configuration creator 112 ascertains from each DLL what group 130 each class belongs to, and then adds that class to the appropriate group 130. This ascertaining step is performed using a heuristic pattern matching algorithm, so that the configuration creator 112 accesses a pattern file 138 and compares the contents of this file 138 with the interfaces that each class exposes. Based on a match between the interfaces and the pattern file 138, the configuration creator 112 can ascertain what group 130 that class belongs to, and then add that class to the appropriate group 130.

The configuration creator 112 is now ready to allow a user to create an ATM application. The user is typically an owner, or an employee or consultant of the owner, of the ATMs 12.

An example of an early stage of developing part of an ATM application is illustrated in FIG. 3a. To create the configuration shown in FIG. 3a, the user selects (for example, using a pointer, such as a mouse) a desired class from the class listing area 124 and drags this class to the association area 122. Each of the classes includes one or more properties (type information) listing the names of other classes that can be accessed by, or that can access, that particular class. When a class is dragged to the association area 122, the configuration creator 112 creates an instance of that class, and allows at least some of the properties of that class to be changed by the user.

When the user selects a MainFlow class and drags this class to the association area 122, the configuration creator 112 creates a box 140a at the portion of the association area 122 to which the MainFlow class was dragged. The box 140a represents an instance of the MainFlow class. The MainFlow class includes the flow logic needed to branch to the particular transactions being offered to an ATM customer. Thus, the MainFlow class includes type information (metadata) relating to classes such as WithdrawalFlow (which leads a customer through a withdrawal transaction), DepositFlow (which leads a customer through a deposit transaction), BalanceFlow (which leads a customer through a balance enquiry), PINChange (which leads a customer through a transaction that changes the customer's PIN), and such like. This type information includes interfaces to these classes.

In this example, a withdrawal transaction is being created, so the user drags a WithdrawalFlow class from the class listing area 124 to the association area 122. The configuration creator 112 creates a box 140b representing an instance of the WithdrawalFlow class at the portion of the association area 122 to which that class was dragged. The WithdrawalFlow class includes type information indicating that it can be accessed by an instance of the MainFlow class, and that it can access an instance of a WithdrawalTx class to initiate execution of a transaction.

Figure 3B:
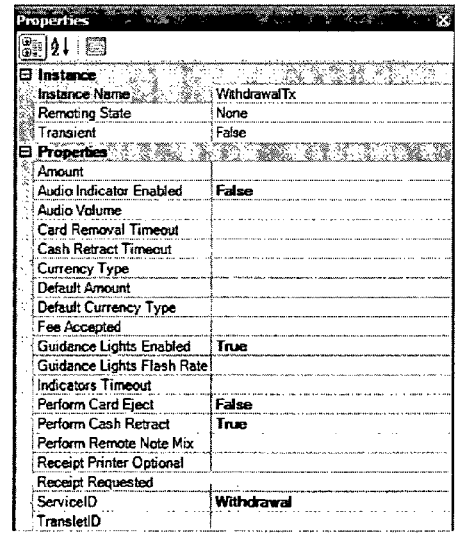
FIG. 3b is a pictorial diagram illustrating part of the graphical user interface (properties of an instance of a class) of FIG. 3a in more detail.

The user then drags a WithdrawalTx class from the class listing area 124 to the association area 122, and the configuration creator 112 creates a box 140c representing an instance of the WithdrawalTx class. The WithdrawalTx class provides information about the amount of funds requested by the ATM customer, coordinates approval of the withdrawal request, and coordinates fulfilment of the withdrawal request. The WithdrawalTx class includes type information indicating that it can be accessed by an instance of the WithdrawalFlow class, and that it can access an instance of an AccountService class to implement the requested withdrawal transaction. If the user selects the box 140c then the properties associated with that instance of the WithdrawalTx class are shown as a dialog box 150 in the properties listing area 126, as illustrated in FIG. 3a and in more detail in FIG. 3b. The properties dialog box 150 indicates the name of the instance (in this example, WithdrawalTx), as well as various properties of this instance. The user can change the values of the properties associated with that instance by selecting a desired property (such as Audio Indicator Enabled) and typing in a new value for that property (such as False, which instructs the ATM not to provide an audio indicator when a withdrawal transaction is being fulfilled).

The user can draw an arrow from the MainFlow instance 140a to the WithdrawalFlow instance 140b (illustrated by arrow 141a) because two conditions are fulfilled. Firstly, the MainFlow instance 140a includes type information (in the form of a property called WithdrawalFlow) supporting access to the WithdrawalFlow class. Secondly, the WithdrawalFlow instance 140b includes type information (in the form of an interface that supports access from the MainFlow instance 140a) supporting access from the MainFlow class. When this arrow 141a is drawn, the configuration creator establishes a relationship between these two instances 140a,b, sets the WithdrawalFlow property to the value "WithdrawalFlow", and labels the arrow "WithdrawalFlow". Although referred to as an instance, at this stage 140a is really only a graphical representation of an instance; an actual instance of the MainFlow class will only be created when the runtime executable is created.

Similarly, the user can draw an arrow 141b from the WithdrawalFlow instance 140b to the WithdrawalTx instance 140c because the type information for both instances 140b,c is consistent with this relationship. However, if the user attempts to draw an arrow from the MainFlow instance 140a to the WithdrawalTx instance 140c, then the configuration creator 112 will not permit this to occur because the MainFlow instance does not have type information that supports a relationship with the WithdrawalTx instance 140c.

The user continues to drag classes from the class listing area 124 to the association area 122, until all of the components are in place for an ATM application.

Figure 4:
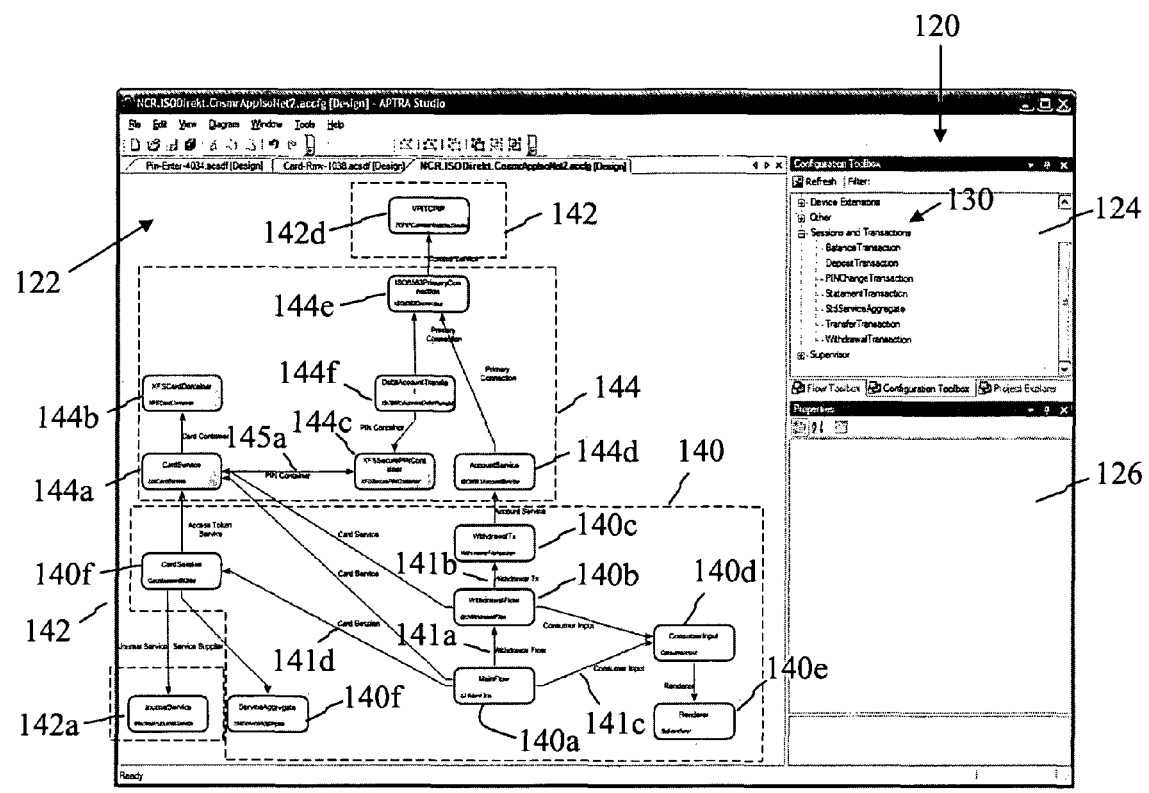
FIG. 4 is a pictorial diagram of the graphical user interface of FIG. 3a, showing creation of the terminal application at a later stage.

Reference will now be made to FIG. 4, which illustrates the GUI 118 at a later stage, when the user has dragged a number of classes to the association area 122.

As shown in FIG. 4, there are three types of components, namely: channel application (shown in box 140), channel services (shown in boxes labelled 142), and business services (shown in box 144), (management services are not shown in FIG. 4, but would typically be included by the user).

The channel application classes include: the MainFlow class (which controls transaction options presented to a user, collects card details for a transaction, and such like), the WithdrawalFlow class (which controls withdrawal screens to collate withdrawal amount information, account information from which the withdrawal is to be made, and such like), the WithdrawalTx class (which prepares card information, transaction amount information, and such like), a ConsumerInput class (which handles inputs and selections from an ATM customer), a Renderer class (which presents information, for example, using HTML, to a customer on the ATM display 18c), a ServiceAggregate class (which ensures that there are sufficient services available to enable the ATM to go into service), and a CardSession class (which coordinates with the ServiceAggregate class to ensure that sufficient services are available and waits for a session to start, for example by an ATM customer inserting his or her ATM card).

The business services classes include: a CardService class (which manages card details read from a customer's ATM card), an XFSCardContainer class (which allows data to be exchanged with a physical card), an XFSSecurePINContainer class (which allows the CardService class to obtain secure information from the encrypting keypad device 18e), an ISO8583PrimaryConnection class (which handles transmission of data according to the ISO 8583 protocol), an AccountService class (which implements a requested transaction), and a DebitAccountTranslet class (which creates the message format for the institution for a specific transaction, that is, the withdrawal transaction). Whereas an AccountService class is generic and may be used for different transactions (withdrawal, deposit, balance enquiry, and such like), the DebitAccountTranslet class is specific for a withdrawal transaction.

The channel services classes include: a JournalService class (which manages printing of transaction details using the journal printer device 18g) and a VPITCPIP class (which manages the physical communication between the ATM 12 and the remote authorization host 104).

The user can select any of the above classes (using a mouse or any other convenient input device) from the class listing area 124 and drag the selected class to the association area 122. The classes can be selected and dragged in any order or in a random order.

When multiple instances (from different classes) are dragged onto the association area 122, the user can establish a relationship between any two instances, provided that the properties for those instances allow the relationship to be established. For example, in FIG. 4 the MainFlow instance 140a can ascertain what an ATM customer has selected by accessing the ConsumerInput instance 140d, as illustrated by arrow 141c. The ConsumerInput instance 140d can access a Renderer instance 140e to control presentation of information to the customer at the ATM 12.

The MainFlow instance 140a can also provide an encrypted version of a PIN entered by the customer to a CardSession instance 140f, as illustrated by arrow 141d. The CardSession instance 140f can access a JournalService 142a to record a transaction for audit purposes. The CardSession instance 140f can access a CardService business service instance 144a to manage the card information read from the customer's card and the encrypted PIN. The CardService instance 144a in turn can access both an XFSCardContainer instance 144b and an XFSSecurePINContainer instance 144c to manage an encrypting PIN block derived from the PIN entered by the customer.

The MainFlow instance 140a can access the WithdrawalFlow instance 140b, which in turn accesses an AccountService instance 144d to access a withdrawal transaction service (which is encapsulated by the AccountService instance business service 144d). To execute a transaction, the AccountService instance 144d accesses an ISO8583PrimaryConnection instance 144e, which uses a VPITCPIP instance 142b to communicate with the remote authorization host 104. A DebitAccountTranslet instance 142f also accesses the ISO8583PrimaryConnection instance 144e.

The collection of DLLs 80, which contain the classes described above, are available as APTRA EDGE (trade mark) software objects from NCR Corporation, 1700 S. Patterson Blvd, Dayton, Ohio 45479, USA.

Once the user is satisfied with the configuration shown in the association area 122 (or if the user wishes to save the configuration and complete it at a later date), he or she can instruct the configuration creator 112 to create a configuration file 160. In this embodiment, the configuration creator 112 creates an XML file 160 by (i) creating code sections for each instance on the association area 122, and (ii) populating property information for each instance to describe the relationship with another instance. Describing the relationship with another instance is relatively simple and can be accomplished using an identifier (the name) of the related instance.

A code sequence for a WithdrawalTx instance 140c is shown below. The code sequence has a header which includes: an instance identifier (somewhat confusingly referred to as a Class ID in the code sequence); a name (referred to as Name in the code sequence) of the class from which the instance is to be created; the name of the DLL that contains that class (referred to as Assembly in the code sequence); and coordinates that represent where the graphical representation of that instance (for example box 140c) appears on the association area 122. These coordinates ensure that the user can open a previously saved file and continue to add to or otherwise change the graphical representation in the association area 122. The code sequence also includes a main body.

The main body of the code sequence comprises the particular properties for that instance, such as another instance (AccountService) that is related to the WithdrawalTx instance 140c, and various operational parameters, such as whether cash is retracted if not removed by a customer within a predetermined time. In this example, the relationship is set because the value is "AccountService"; if the value was zero, then there would be no relationship established with the AccountService instance (if such an instance existed in the ATM application). The ServiceID is a unique identification.

```
<Class ID="WithdrawalTx"
Name="NCR.APTRA.WithdrawalTx.WithdrawalTransaction"
Assembly="NCR.APTRA.WithdrawalTx.dll" X="450" Y="390">
    <Interface>
        <Property Name="AccountService" Value="AccountService" />
        <Property Name="PerformCardEject" Value="False" />
        <Property Name="PerformCashRetract" Value="True" />
        <Property Name="GuidanceLightsEnabled" Value="True" />
        <Property Name="AudioIndicatorEnabled" Value="False" />
        <Property Name="ServiceID" Value="Withdrawal" />
    </Interface>
</Class>
```

A code sequence for the AccountService instance 144d (which is related to the above-described WithdrawalTx instance 140c) is shown below. Again, the code sequence begins with a header including an instance identifier, a class identifier for the class from which the instance is to be created, and the DLL that contains that class, and x,y coordinates of the location of the corresponding box 144d in the association area 122. This instance is related to the ISO8583PrimaryConnection instance 144e as shown in FIG. 4 and as described below.

When the configuration file 160 is loaded up into the ATMs 12, the configuration builder 70 (which acts as a class configurator) parses through the configuration file 160 and creates an executable ATM application therefrom.

In parsing through the configuration file 160, for each instance (which has its own code sequence) the configuration builder 70 does four actions. Firstly, the configuration builder 70 locates the DLL containing the class from which that instance is derived (for example, "NCR.APTRA.WithdrawalTx.dll" for the WithdrawalTx instance 140c). Secondly, the configuration builder 70 creates an instance of this class. Thirdly, it sets all of the properties of this instance to correspond with the operational parameters listed in the code sequence for that for instance (for example, "AudioIndicatorEnabled" and "PerformCardEject" are both set to off (FALSE); whereas "PerformCashRetract" and "GuidanceLightsEnabled" are both set to on (TRUE)). Fourthly, it creates relationships between instances that were coupled on the association area 122 by ascertaining what other instances are referenced in the properties of the code sequence for that instance (for example, in the WithdrawalTx instance, an "AccountService" instance appears in the properties and the relationship is set because the value of this property is "AccountService"; if the value was zero then the relationship would not be set).

Although the configuration builder 70 performs the same actions for each instance to be created, the configuration builder 70 creates the instances in a specific order. The configuration builder 70 first parses through the configuration file 160 to identify those instances that do not access other instances, and then creates those identified instances (because they do not require other instances to be present). In FIG. 4, these instances include: the Renderer instance 140e, the ServiceAggregate instance 140f, the JournalService 142a, the XFSCardContainer instance 144b, the VPITCPIP instance 142d, and the XFSSecurePINContainer instance 144c (although it may appear that arrow 145a is double headed, it is actually only a single headed arrow from the CardService instance 144a to the XFSSecurePINContainer instance 144c).

Next, the configuration builder 70 identifies those instances that only access instances already created. In FIG. 4, these instances include: the ISO8583PrimaryConnection

```
<Class ID="AccountService"
Name="NCR.APTRA.ISO8583BSSDK.AcctSrv.ISO8583AccountService"
Assembly="NCR.APTRA.ISO8583BSSDK.AcctSrv.dll" X="450" Y="290">
    <Interface>
        <Property Name="PrimaryConnection" Value="ISO8583PrimaryConnection" />
    </Interface>
        </Class>
```

As stated previously, the configuration creator 112 creates code sequences for each instance, and includes within each code sequence details of relationships to other instances and operational parameters for that instance. These code sequences are combined to form the configuration file 160. The configuration file 160 contains all instances, relationships, and parameters needed to create a runtime executable ATM application.

The configuration file 160 can then be distributed to the ATMs 12, either via remote software distribution across the network 102 (illustrated in FIG. 1 by multiple configuration files 160 in broken line), or by installation by a service person locally at the ATMs 12.

instance 144e, the CardService instance 144a, and the ConsumerInput instance 140d. This is performed iteratively until all of the instances have been created. If two instances each required the other, then the configuration builder 70 would arbitrarily select one instance and create that.

When all of the instances have been created and configured with the appropriate relationships and operational parameters, the resulting file is a runtime executable ATM application 170 (shown in broken line in FIG. 2) which has been created by configuration builder 70. The configuration builder 70 can then launch this runtime application 170 to control the ATM 12.

When executed, the application 170 presents an attract sequence screen on the ATM display 18c, and allows an ATM customer to enter a transaction (such as cash withdrawal) in a conventional manner. The ATM customer is completely unaware of how the ATM application 170 was created.

It will now be appreciated that the above embodiment has the advantage that conventional software objects (commercially available classes) can be used without modification in a new application development process that offers the speed and flexibility of scripting and also the type-safe advantages of compilation. An instance is described in an XML file, including the relationships between that instance and other instances. These relationships are all type-safe because of the indexing function previously performed.

Various modifications may be made to the above embodiment within the scope of the present invention. For example, in other embodiments, non-ATM terminals may be used, such as postal kiosks, self-checkout terminals, airline kiosks, hotel kiosks, and such like. In other embodiments software components other than DLLs may be used to store the classes. In other embodiments, the layout of the GUI may be different. In the above embodiment each class is not saved by the configuration creator because the ATM has access to the same DLLs holding the classes; however, in other embodiments, the configuration creator may also provide the classes in addition to the configuration file. In other embodiments, the configuration file may be provided in a format other than XML.

What is claimed is:

1. A method of creating a terminal application for use in a target computer, the method comprising:
    accessing software components, from libraries, to be used in different terminal applications executed by different target computers having different configurations;
    retrieving type information from metadata in classes of said libraries, including interfaces, operations, properties, and events associated with each class within the software components to ascertain type-safe relationships that are possible for each class based upon the type information;
    graphically representing each class in a control area of a screen together with type-safe relationship information for that class, each of the classes include one or more properties listing the names of other classes that can be accessed by, or that can access, that particular class;
    providing an association area of the screen to allow a user to create on the association area an instance of a class graphically represented on the control area;
    allowing a user to establish a relationship between an instance from one class and an instance from a different class only when the relationship is consistent with the type-safe relationship information for both classes;
    creating a configuration file describing the created instance and the relationships between the created instances and tailored to the configuration of the target computer
    receiving the configuration file at the target computer;
    wherein the target computer performs the steps of:
        accessing the software components that may be used in the terminal application;
        interpreting the configuration file to ascertain instances referenced by that file and relationships between instances referenced by that file; and
        creating a run-time executable code of the terminal application, using the configuration file and the software components.

2. A method according to claim 1, wherein the configuration file further includes operational parameters for each instance.

3. A system for creating a terminal application for use in a target computer, the system comprising:
    (1) memory for storing software; and
    (2) a processor for executing the software, the software comprising instructions to execute:
        (A) a configuration creator executable by a configuration computer operable to (i) retrieve type information from metadata in classes of libraries within software components, the type information including interfaces, operations, properties, and events associated with each class within the libraries, the libraries to be used in different terminal applications executed by different target computers having different configurations, the type information to be used to ascertain type-safe relationships that are possible for each class based upon the type information, a graphical user interface including a control area for displaying classes that can be used in the terminal application together with type-safe relationship information for that class, wherein each of the classes include one of more properties listing the names of other classes that can be accessed by, or that can access, that particular class (ii) allow a user to create an instance of a class, (iii) allow a user to establish a relationship between an instance from one class and an instance from a different class only when the relationship is consistent with the type-safe relationship information for both classes, and (v) create a configuration file describing the created instances and the relationships between the created instances and tailored to the configuration of the target computer; and
        (B) a configuration builder executable by the-target computer operable to receive the configuration file, access the software components that may be used in the terminal application, interpret the configuration file to ascertain instances referenced by that file and relationships between instances referenced by that file, and create a run-time executable code of the terminal application, using the configuration file and the software components.

4. A system according to claim 3, wherein the configuration builder is further operable to ascertain which instances do not depend on other instances, and to create the instances that do not depend on other instances prior to creating instances that do depend on other instances.

5. A system according to claim 3, wherein the configuration builder is further operable to indicate that the terminal application has been created and is ready to be executed.

6. A configuration creator for use in creating a terminal application for-a target computer, the configuration creator comprising:
    (A) memory for storing software;
    (B) a processor for executing the software, the software comprising instructions configured to execute:
        (i) an indexing routine for examining type information from metadata in classes of libraries within software components, the type information including interfaces, operations, properties, and events associated with classes within the libraries that can be used in different terminal applications executed by different-target computers having different configurations and ascertaining possible type-safe relationships for each software component based upon the type information
        (ii) a graphical user interface including a control area for displaying classes that can be used in the terminal application, along with type safe relationship information for that class, wherein each of the classes include one of more properties listing the names of other classes that can be accessed by, or that can access, that particular class and an association area for creating instances of the displayed classes and allowing type-safe relationships to be established between created instances, and (iii) a file creation routine for creating a configuration file tailored to the configuration of the target computer including code describing created instances and relationships established between the created instances, so that the configuration file can be parsed by the target computer to create a run-time executable code of a terminal application for use in the target computer using the software components.

7. A configuration creator according to claim 6, wherein the control area presents available classes to a user.

8. A configuration creator according to claim 6, wherein the control area allows a user to configure an instance by editing properties associated with that instance.

9. A non-transitory computer readable medium comprising computer executable program instructions for execution by a processor, the instructions comprising instructions for:

(i) examining type information from metadata in classes of libraries within software components, the type information including interfaces, operations, properties, and events associated with available software components, from the libraries, to be used in different terminal applications executed by different target computers having different configurations and ascertaining possible type-safe relationships for each software component based upon the type information (ii) displaying classes that can be used, along with type-safe relationship information for the classes, wherein each of the classes include one of more properties listing the names of other classes that can be accessed by, or that can access, that particular class, creating instances of the displayed classes, and allowing type-safe relationships to be established between created instances, and (iii) creating a configuration file tailored to the configuration of a target computer including code describing created instances and relationships established between the created instances, so that the configuration file can be parsed by the target computer to create a run-time executable code of a terminal application for use in the target computer using the software components.

* * * * *